United States Patent
Griffin (10) Patent No.: US 7,817,805 B1
(45) Date of Patent: Oct. 19, 2010

(54) SYSTEM AND METHOD FOR STEERING THE DIRECTIONAL RESPONSE OF A MICROPHONE TO A MOVING ACOUSTIC SOURCE

(75) Inventor: Michael R. Griffin, Austin, TX (US)

(73) Assignee: Motion Computing, Inc., Austin, TX (US)

( * ) Notice: Subject to any disclaimer, the term of this patent is extended or adjusted under 35 U.S.C. 154(b) by 1657 days.

(21) Appl. No.: 11/034,385

(22) Filed: Jan. 12, 2005

(51) Int. Cl.
H04R 3/00 (2006.01)

(52) U.S. Cl. .......................... 381/92; 367/103; 367/108

(58) Field of Classification Search ................... 381/92, 381/26, 122, 306; 367/99, 103, 104, 108
See application file for complete search history.

(56) References Cited

U.S. PATENT DOCUMENTS

| | | | |
|---|---|---|---|
| 4,333,170 A | | 6/1982 | Mathews et al. |
| 4,489,442 A | | 12/1984 | Anderson et al. |
| 4,559,642 A | * | 12/1985 | Miyaji et al. ................... 381/92 |
| 4,644,512 A | * | 2/1987 | Grilk ........................ 367/108 |
| 5,208,864 A | | 5/1993 | Kaneda |
| 5,452,364 A | * | 9/1995 | Bonham ...................... 381/92 |
| 5,473,701 A | | 12/1995 | Cezanne et al. |
| 5,581,620 A | * | 12/1996 | Brandstein et al. ............ 381/92 |
| 5,586,191 A | | 12/1996 | Elko et al. |
| 5,715,319 A | | 2/1998 | Chu |
| 5,778,082 A | | 7/1998 | Chu et al. |
| 5,978,490 A | * | 11/1999 | Choi et al. ..................... 381/92 |
| 6,041,127 A | | 3/2000 | Elko |
| 6,185,152 B1 | | 2/2001 | Shen |
| 6,317,501 B1 | | 11/2001 | Matsuo |
| 6,469,732 B1 | | 10/2002 | Chang et al. |
| 7,123,727 B2 | * | 10/2006 | Elko et al. ..................... 381/92 |
| 7,227,960 B2 | * | 6/2007 | Kataoka ....................... 381/92 |

OTHER PUBLICATIONS

Kozicki, "The Importance of the Microphone to the Pocket PC," 1994, White Paper obtained from www.emkayproducts.com, 4 pages.

* cited by examiner

*Primary Examiner*—Vivian Chin
*Assistant Examiner*—Jason R Kurr
(74) *Attorney, Agent, or Firm*—Kevin L. Daffer; Daffer McDaniel, LLP (57) ABSTRACT

A system and method are provided for automatically tracking the movements of an acoustic source relative to two or more microphones possibly mounted in a portable device. The microphones are mounted so that they may be separated from an acoustic source that can be more than three inches from the portable device. By automatically tracking the location of a portable device, a directional response of unidirectional microphones in a far field setting can be steered so that the radial axis of the directional response aligns with the path in which the acoustic wave travels from the source to the microphones. By tracking the source and steering the directional response of the microphones, the system can thereby properly delay and filter electrical signals added to the outputs from corresponding microphones to maximize the signal-to-noise ratio of the ensuing signal.

15 Claims, 5 Drawing Sheets

SYSTEM AND METHOD FOR STEERING THE DIRECTIONAL RESPONSE OF A MICROPHONE TO A MOVING ACOUSTIC SOURCE

BACKGROUND OF THE INVENTION

1. Field of the Invention

The present invention relates in general to the field of microphones and tablet personal computers and, more particularly, to a plurality of microphones possibly arranged in the tablet (i.e., a microphone array) that has a directional polar response that continuously and automatically adapts to movement of an acoustic source.

2. Description of the Related Art

The following descriptions and examples are not admitted to be prior art by virtue of their inclusion within this section.

A microphone is generally recognized as an electro-acoustic transducer that converts an acoustic or sonic wave into an electrical signal. There are numerous types of transducers on the market, including piezoelectric transducers or transducers having a diaphragm that is pressure-sensitive.

Depending on the application, microphones can be chosen having different performance criteria. For example, a microphone can be embedded into a mouthpiece of a headset, with the mouthpiece less than a few inches from the speaker's mouth. In this example, the microphone is said to be placed in a "near field" setting. Alternatively, the microphone can be arranged at a pickup location on a table several feet away. In this example, the microphone is said to be placed in a "far field" setting. It is generally recognized that a near field setting is one in which the acoustic source is less than three inches from the microphone. See, Kozicki, "The Importance of the Microphone to the Pocket PC," 2004, herein incorporated by reference.

The importance of knowing whether a microphone will be placed in a near field or far field setting is derived, in part, on whether the microphone will experience fairly significant noise. For example, a near field microphone placed within three inches of a speaker's mouth (i.e., the acoustic source) does not receive anywhere near the amount of background noise from the surrounding room compared to a far field microphone. For speech recognition systems, it is desirable that the signal-to-noise ratio (SNR) exceed 20 dB in order for speech to be recognized. If the microphone is placed in a near field setting, then the microphone can be formed as either a bidirectional, unidirectional, or omni-directional microphone. Conversely, if the microphone is placed in a far field setting, the microphone is generally a unidirectional microphone.

The primary difference between an omni-directional microphone and a unidirectional microphone is the directional polar response of those microphones. An omni-directional microphone can be a diaphragm-type microphone in contact with a sealed volume. Pressure upon that sealed volume from any direction around the diaphragm will cause the diaphragm to vibrate. Thus, the microphone picks up signals (and noise) anywhere around the microphone in a 360° directional polar response pattern. Conversely, a unidirectional microphone can be made in which the diaphragm or piezoelectric material is exposed on both sides to provide a pressure gradient difference between the front surface and the back surface. In addition, the acoustic wave from a forward direction will strike the back surface after it strikes the front surface, causing an internal acoustic time delay.

The time delay can be processed to bias the directional polar response of a unidirectional microphone toward a preferred direction. Moreover, there will be various null positions within the directional polar response near the side and back of the unidirectional microphone to effectively discard any background noise placed near the side and back of the microphone, and thus generally outside the forward-looking beam path angle. A unidirectional microphone thereby typically exhibits a "cardiod" directivity polar response pattern, whereby the SNR is greater within the forward beam path angle, and significantly lower outside that angle.

It is less cumbersome and thus more convenient for a user to interact with electronic systems that employ a microphone in a far field setting, with the microphone and acoustic source separated by more than three inches. Unfortunately, however, the acoustic source may periodically move while speaking into the microphone. For example, a user of a portable electronic system, such as a laptop computer, tablet personal computer (PC), or personal digital assistant (PDA), may move relative to a speaker mounted into the laptop, tablet PC, or PDA. If the acoustic source moves outside the desired beam path angle, then the SNR will be significantly jeopardized and, possibly, lower than the 20 dB needed to achieve adequate speech recognition. Thus, a system and method is needed to target and track an acoustic source relative to a microphone in a far field setting. Moreover, once the location of the source is identified, optimal SNR is achieved if the desired system and method can automatically and periodically update any movement of the source or changes in the source frequency, so that processing can occur to maintain the highest possible SNR no matter where the acoustic source is located, or the frequency of the acoustic signal.

SUMMARY OF THE INVENTION

The problems outlined above are in large part solved by a unique microphone arrangement and signal processing system and method hereof. Two or more microphones can be placed in a far field setting to receive an acoustic wave provided from a source more than three inches from the microphones. For example, the microphones can be mounted in an electronic display housing proximate to the display screen of, for example, a portable device such as a laptop computer, tablet PC, pen tablet PC, or PDA. Contained within the present system and method is a user-programmed execution engine that samples incoming electrical signals output from the microphone transducers. The amount of time between samples can be chosen from an instruction placed into local memory through an input device.

The execution engine not only determines how often the acoustic signal is sampled, but can also process certain parameters used in describing that acoustic signal. For example, the acoustic signal can impinge on the microphones at a particular angle depending on where the acoustic source is located relative to the microphones. By using two or more microphones spaced a known distance from each other, the angle of impingement can be determined based on a difference between the time of arrival of the acoustic wave on one microphone versus the other. Alternatively, depending on the wavelength of the acoustic signal, a phase difference might be used to determine the angle of impingement.

In addition to determining the angle of impingement, it may also be necessary to determine the frequency of the acoustic signal. In a far field setting, attenuation of an acoustic signal can vary depending on its frequency. Knowing both the angle of impingement and frequency can thereby allow the execution engine to provide a more accurate processing of electrical signals output from each of the corresponding two or more microphones arrangement.

The signal parameters, such as angle of incidence and frequency, allow the execution unit to derive more accurate delay and filter weighting coefficients. Those coefficients are then used by a delay element and tunable filter, whose outputs are mixed with the microphone transducer outputs to steer the directional polar response along an angle at which the acoustic wave impinges upon the microphones.

Rotating the radial axis of the directional response so that the radial axis now substantially aligns with the angle of impingement ensures that the unidirectional microphones can achieve a maximum SNR. The radial axis is periodically updated based on the frequency at which samples are taken. If, for example, the acoustic source moves more frequently, the timeframe at which samples are taken can also be lessened.

Automatically and periodically updating the radial axis of the directional response allows the system and method hereof to more accurately capture the acoustic source while rejecting any surrounding noise outside the beam path angle. The user can override the radial axis of the directional response calculated by the system if desired. For example, the radial axis of the directional response, through which maximum SNR is achieved, can be displayed on an electronic display device. A user input via a pointing device can be applied to the radial axis quantified and displayed. By simply clicking on the radial axis number, a user can change the radial axis so that possibly another acoustic source located somewhere else in the room can be captured. By displaying the automatically calculated radial axis, a user can be apprised of which acoustic source is currently undergoing maximum SNR processing. By manually changing the displayed axis, the present system might allow a user to manually capture two or more acoustic sources talking at different times.

According to one embodiment, a system is provided for automatically updating a directional response of a pair of microphones. The pair of microphones can be arranged in accordance with a microphone array, with a known distance between microphones. The directional response is updated at periodic intervals whenever an acoustic source moves. The system includes one detector configured to determine a change in one or more parameters of an acoustic wave. Those parameters might include an angle of incidence and frequency of the acoustic wave forwarded from the acoustic source to the pair of microphones. The system can also include an electric subsystem coupled to a detector for periodically updating the directional response from the change in one or more parameters.

The electronic system updates the directional response by placing a radial axis of a calculated directional response substantially along an angle at which the acoustic wave impinges upon the pair of microphones. By aligning the radial axis of maximum SNR of the directional response along the path taken by the acoustic wave, the unidirectional pair of microphones (i.e., two or more) will achieve maximum SNR of that acoustic wave while achieving lower SNR for any and all acoustic waves outside a particular beam path angle from that calculated radial axis. For example, if the angle of incidence is 30° from perpendicular, where perpendicular is measured as 0°, the beam path angle might be 15° on either side of the 30° angle of incidence. Thus, any background noise outside of 30°+/−15° (i.e., 15° to 45° will be significantly lowered to almost one half the source amplitude.

According to an alternative embodiment, a method is provided for changing the directional response of a pair of microphones. The pair of microphones might have a directivity pattern of maximum SNR along a radial axis extending from the pair of microphones. The method includes moving an acoustic source. Thereafter, an angular orientation is determined of the acoustic wave extending from the moved acoustic source to the pair of microphones. Outputs from one or more of the pair of microphones are then modified such that the directional response of the pair of microphones is updated to substantially align with the angular orientation of the acoustic wave.

BRIEF DESCRIPTION OF THE DRAWINGS

Further advantages of the present invention may become apparent to those skilled in the art with the benefit of the following detailed description of the preferred embodiments and upon reference to the accompanying drawings in which.

While the invention is susceptible to various modifications and alternative forms, specific embodiments thereof are shown by way of example in the drawings and may herein be described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

As used herein, the term "far field" generally refers to a microphone spaced and separated from an acoustic source by more than three inches. The term "microphone array" refers to two or more microphones placed along one axis or two axes a spaced and known distance apart. "Angle of incidence" or "angle of impingement," refers to the angle at which the linear direction of an acoustic wave travels to and contacts the microphone array. For example, if an acoustic source emits an acoustic wave that travels to and contacts a plane in which the microphone array is arranged, and that angle of incidence is perpendicular to the plane, the angle of incidence is said to be at 0°. If the acoustic wavefront travels parallel to the plane or linear axis formed by the microphone array, then the angle of incidence is 90° positive or negative depending on the direction at which the wavefront travels.

The microphone array can be embedded within a casing of a system, with the pressure-sensitive portion of the microphone exposed to the medium through which the acoustic wave travels. The system can be a "portable system" described herein as any system which can be readily moved by a user. Examples of such portable systems include laptop computers, tablet PCs, pen tablet PCs, PDAs, all of which are commercially available from companies including, but not limited to, Motion Computing, Fujitsu, Acer, Toshiba, Compaq, and USonic.

Figure 1:
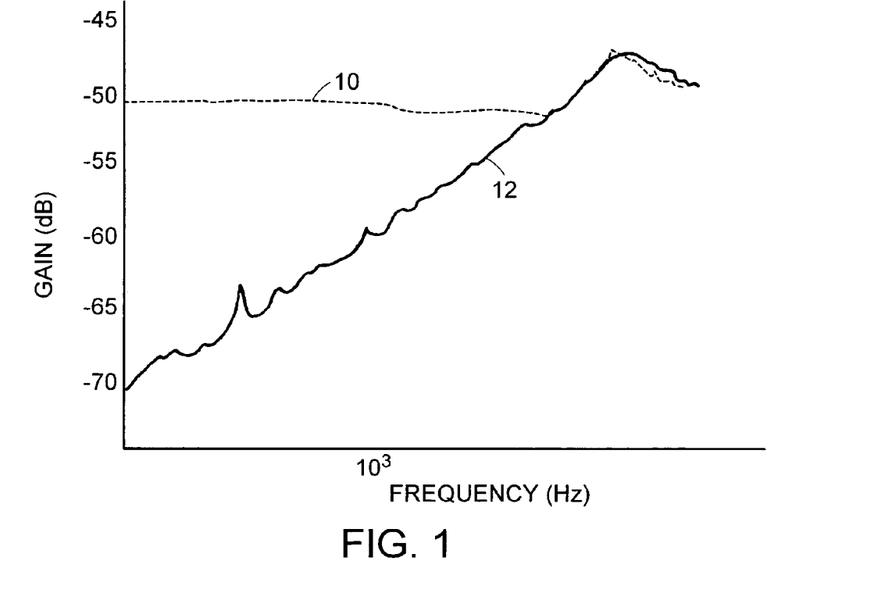
FIG. 1 is a graph of gain as a function of frequency for microphones placed in the near field and far field.

Turning now to the drawings, FIG. 1 illustrates a discrepancy between a near field situated microphone and a far field situated microphone. A near field microphone is shown having a relatively flat response curve 10 over various speech frequencies. The far field response curve 12 exhibits a 6 dB per octave roll-off towards lower frequencies. As shown, at 1 kHz, the far field curve 12 is approximately down 9 dB with respect to the near field curve 10. This allows for a differentiation at different frequencies. For example, if noise is detected at lower frequencies, the noise component of an acoustic wave can be discarded through a properly tuned filter.

While noise is generally not always predictable to be at lower frequencies than the desired acoustic source, FIG. 1 nonetheless indicates the correspondence between acoustic signal frequency and gain in a far field setting. Therefore, it is beneficial to ascertain the frequency of the acoustic signal in order to more properly model the SNR response of the microphone placed more than three inches from the acoustic source. As shown, if the frequency should drop below approximately 2 kHz, a tuned amplifier is needed to boost the amplitude of that signal while rejecting noise arriving on the microphone at an incident angle outside the beam path angle. Accordingly, optimal modeling takes into account the characteristic shown in FIG. 1 as well as FIGS. 2a and 2b.

Figure 2A:
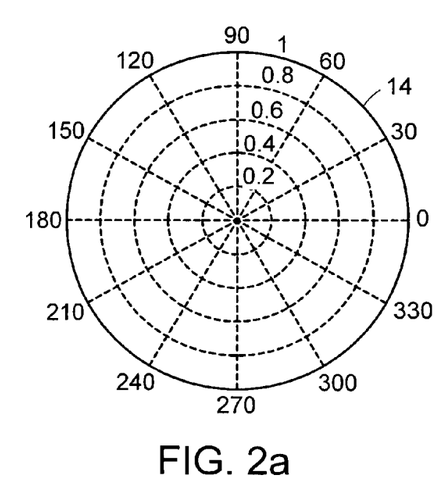
FIG. 2a is a directional polar response for an omni-directional microphone.
Figure 2B:
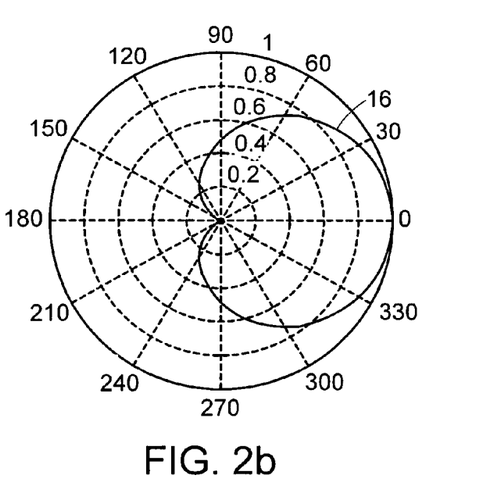
FIG. 2b is a directional polar response for a unidirectional, or cardiod, microphone.

Referring to FIGS. 2a and 2b in combination, the directional polar responses 14 and 16 are shown for an omni-directional microphone and a unidirectional microphone, respectively. Directional response 14 for an omni-directional microphone is shown having the same gain of 1 dB for all possible radial axes between 0° and 360°. Thus, the same SNR will be achieved regardless of where the acoustic source is located relative to the microphone. Conversely, the directional response 16 for a unidirectional microphone is illustrated as a cardiod. The cardiod indicates that a maximum SNR is achieved in a preferred radial axis of 0°. For example, if an unwanted acoustic source is positioned at +/−90° (i.e., perpendicular to the plane formed by the microphone array), then the unwanted source will be attenuated by approximately 6 dB. A 6 dB attenuation represents approximately one half the amplitude of that unwanted signal.

As shown in FIG. 2b, it is desirous to place the acoustic source at the 0° radial axis of the directional response 16. If not placed at the 0° radial axis, then the source should be placed within a beam path angle of approximately 15° offset from 0° in order for the acoustic signal to suffer minimal attenuation. However, as will be shown in FIGS. 3 and 4, the acoustic source is not stationary. If the source moves from the 0° radial axis, a mechanism must be in place to track the movement and realign the radial axis of the directional response to the angle of incidence. The tracking might also take into account the frequency response characteristic of the acoustic signal transferred in a far field setting if, for example, the microphone array is placed in a portable device separate from the source by more than three inches.

Figure 3:
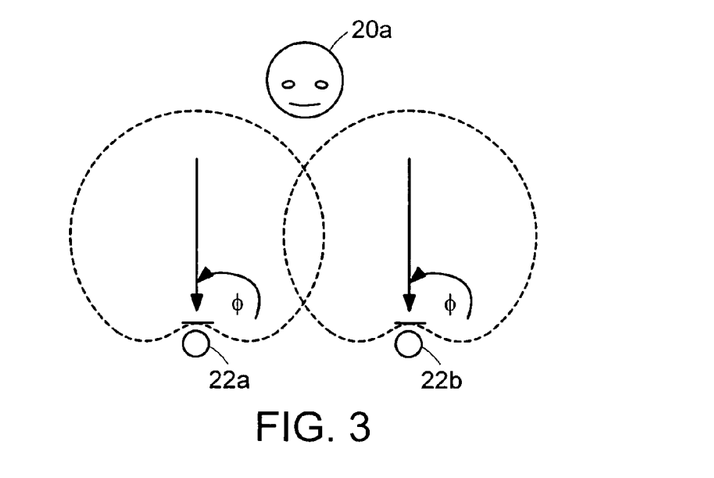
FIG. 3 is a top plan diagram of a microphone array receiving an acoustic wave traveling at an angle φ of 0°.
Figure 4:
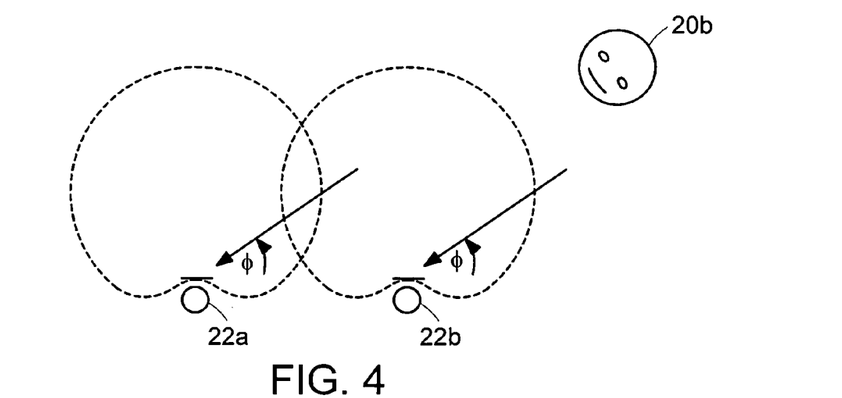
FIG. 4 is a top plan diagram of a microphone array receiving an acoustic wave traveling at an angle φ between 0° and 90°.

FIGS. 3 and 4, when referred to in combination, illustrate a top view of an acoustic source that moved from position 20a to position 20b. A microphone array having at least two microphones 22a and 22b may be optimally configured to capture an acoustic source 20a of FIG. 3 by arranging the radial axis along the angle of incidence, shown as $\phi$. By placing the radial axis of the directional response at $\phi=0°$, maximum SNR is achieved. However, if the acoustic source moves as shown in FIG. 4 to position 20b, the angle of incidence $\phi$ will change to be closer to 90°. If the radial axis of the directional response remains at 0°, however, the microphone array 22 will not produce sufficient SNR to achieve voice recognition of signal source 20b. This is especially true if the far field environment contains noise, some of which imputes into the beam path angle of +/−15° off 0° if the radial axis remains at 0°, and does not change to accommodate the new angle of incidence. Moreover, the change must be somewhat continuous to accommodate continual movements of acoustic source 20.

The concepts of a directional polar response, radial axis, and beam path angle, as well as unidirectional and omnidirectional microphones placed in an array are set forth in U.S. Pat. Nos. 6,041,127; 5,586,191; and 5,473,701 each of which are herein incorporated by reference. While the problem of a moving acoustic source is relatively known, conventional techniques for tracking that source and readjusting the directional polar response are inadequate for microphones arranged in a far field setting, when using unidirectional microphones. Conventional solutions do not take into account variable gain at speech frequencies or fail to apply the principles of unidirectional microphones. Other conventional teachings with such failings are set forth in U.S. Pat. Nos. 6,317,501; 5,208,864; 4,489,442; and 4,333,170 each of which are herein incorporated by reference.

Figure 5:
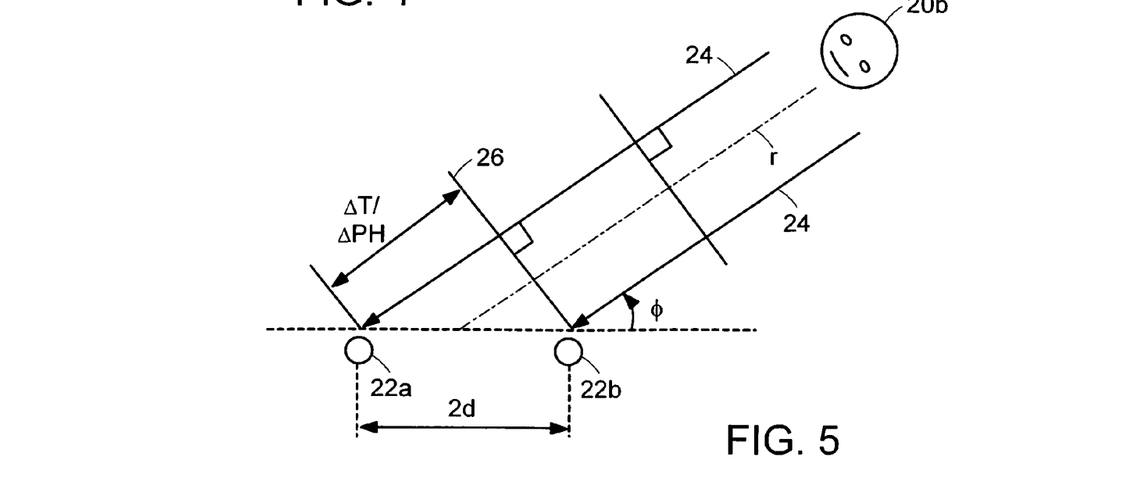
FIG. 5 is a top plan diagram of a microphone array receiving an acoustic wave at a time or phase differential proportional to the angle φ.

FIG. 5 illustrates the angle of incidence $\phi$ along a direction of travel 24 of the acoustic wave sent from source 20b to microphone array 22. A wavefront 26 occurs perpendicular to the direction of travel 24. Wavefront 26 strikes the nearest microphone 22b within the array first, followed by it striking the furthest microphone 22a sometime thereafter. The time delay $\Delta$between the wavefront striking the nearest and then the next microphone within the array can be measured. Likewise, depending on the wavelength of the acoustic wave, a phase difference $\Delta PH$ can also be measured. The time difference or phase difference is directly proportional to the angle of incidence $\phi$. In other words, as $\Delta T$ or $\Delta PH$ increases, the angle of incidence increases beyond the perpendicular ($\phi=0$). In an extreme case, under maximum $\Delta T$ and maximum $\Delta PH$, $\phi=90°$.

Acoustic source tracking mechanisms employ either omnidirectional microphones which do not have a radial axis of maximum SNR, or utilize a near field setting. The sensitivity E of the acoustic wave upon the microphone array is measured by a pressure differential upon that microphone. The pressure differential between a pair of microphones that receive an acoustic wave can also be measured relative to the angle of incidence φ. It is well known that for a near field setting, the pressure differential is:

$$E = \frac{2P_0 d |\cos\phi|}{r^2 - d^2 \cos^2\phi} \quad (1)$$

where $P_0$ is the source peak pressure amplitude, and d is one half the distance between microphones 22a and 22b, and r is the operating distance shown in FIG. 5 from the center between microphones 22a and 22b and the acoustic source 20b.

Derivation of this equation is, in part, described in U.S. Pat. No. 5,586,191 herein incorporated by reference. As illustrated, the above equation contains no frequency dependent terms. That is, the sensitivity E and, thus, the directional polar response, of a near field acoustic source is dependent on the spacing d between microphones, the distance r between a source and the microphones, and predominantly the angle of incidence φ. This is verified from FIG. 1, showing the near field sensitivity curve 10 to be substantially flat across all frequencies. However, FIG. 1 illustrates in a far field setting that frequency has a positive correspondence to sensitivity.

It is further illustrated, in part, in U.S. Pat. No. 5,586,191 that in a far field setting, the directional polar response of sensitivity is:

$$E = \frac{2P_0 kd |\cos\phi|}{r} \quad (2)$$

where k is the acoustic wave number. The acoustic wave number $k=2\pi/\lambda$, where λ is wavelength and is equal to c/f, where c is the speed of sound and f is frequency in Hz. Thus, $k=2\pi f/c$. From the above equation, the directional polar response is directly proportional to frequency f, oftentimes referred to in radians, or w. Thus, whenever kr is much larger than 1, to define a far field setting, the directional polar response, or E, corresponds to both the frequency and angle of incidence of the acoustic wave.

Instead of taking in account frequency, conventional tracking methods typically calculate the angle of incidence φ and apply a weighting factor oftentimes referred to as a scale factor, α or β. Knowing the angle of incidence, a weighting factor can be calculated to maximize SNR by adjusting or tracking a radial axis to the direction of travel or angle of incidence. However, absent taking into account the frequency of the acoustic wave in a far field setting, conventional solutions simply model the directional polar response to:

$$E = \beta + \cos\phi/\beta + 1, \quad (3)$$

without taking into account the frequency parameter.

Figure 6:
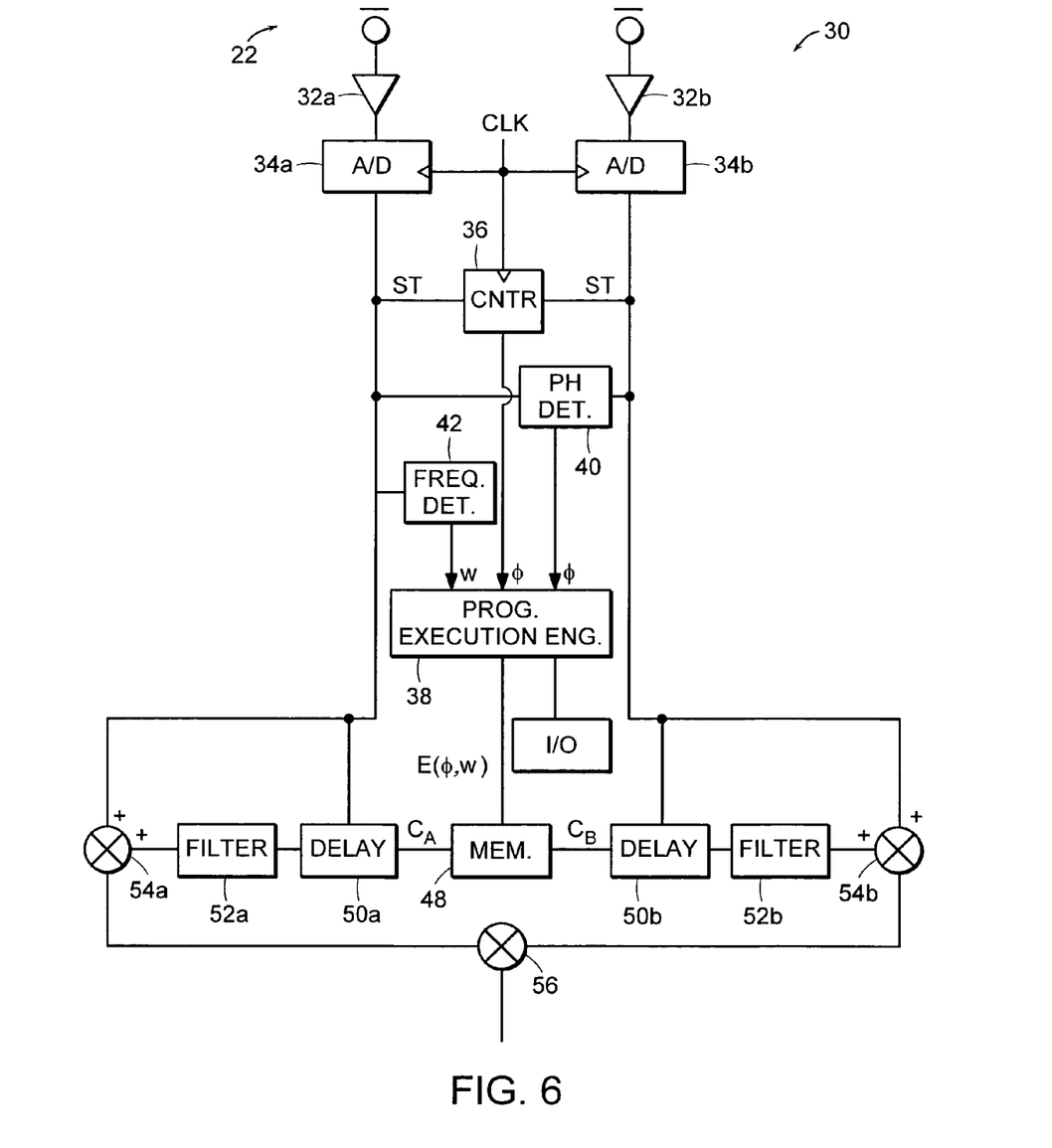
FIG. 6 is a block diagram of an electronic system that captures the acoustic wave and calculates new directional response for the microphone array to increase the signal-to-noise ratio each time the acoustic source moves by applying an appropriate delay and filter weighting to the electric signal produced from each of the plurality of microphones.

FIG. 6 illustrates a system 30 for tracking a moving source and adjusting the radial axis of the directional response to maximize SNR pickup of that moved source. Specifically, system 30 takes into account both the angle of incidence φ as well as the frequency w of the acoustic signal. Microphone array 22 receives the acoustic signal and converts the acoustic signal to an electrical signal, which can then be buffered by an amplifier 32a and 32b coupled to the output of each microphone within the array. The electrical signal can then be periodically sampled to convert the analog output from the microphones into digital signals. Depending upon the sample rate, the analog-to-digital converters 34a and 34b can interpolate the incoming signals, possibly with delta-sigma modulation or other conventional modulation techniques, to arrive at a digital output. The rate at which the analog-to-digital converters perform sampling can be adjusted depending on the incoming acoustic signal frequency. According to one example, the sampling rate can be above the discernable frequency band of a human voice, which is approximately 20-40 kHz. Preferably, the sampling rate is twice the upper frequency range of interest in order to properly achieve Nyquist sampling.

The clocking signal, CLK, which performs the sampling of A/D converters 34 can also be forwarded to a counter. The number of clock cycles can be counted by a counter 36 from the time in which the acoustic wave strikes one microphone versus the other. This can occur possibly during startup (ST) or when the acoustic wave is first sent. When the acoustic wave is resumed after momentary lapses in acoustic wave transmission, measurement can thereafter be taken and a count produced from counter 36. The count value can be scaled through a lookup table possibly associated with counter 36 to produce angle φ directly to the programmable execution engine 38. Alternatively, the count value can be sent to engine 38 that then computes φ.

Instead of using the counter depending on the wavelength of the acoustic signal and the distance between microphones, a phase difference within one cycle of an acoustic wave can be measured. The phase differential can be detected by a phase detector 40. Phase detector 40 can be as simple as a set/reset latch that enters the set state when the acoustic signal is measured on the first microphone, and resets when detected on the second microphone. Phase detection circuitry is well known and widely utilized in, for example, phase-locked loop (PLL) circuitry. The phase difference can be converted through a lookup table directly within detector 40 or within execution engine 38 to arrive at angle φ.

Along with the difference in time of arrival or difference in phase, frequency of the acoustic signal can also be measured. A frequency detector 42 can be as simple as a counter which counts the number of cycles of the converted acoustic signal within a given interval of time, well known to the skilled artisan. The measured frequency w can be computed within detector 42 or within execution engine 38. Armed with the frequency of the acoustic signal as well as the angle of incidence, execution engine 38 can now utilize those parameters to compute an updated sensitivity E and, specifically, the directional response of the microphone array sensitivity. The directional response E is dependent on both φ and w as shown by signal E(φ,w) output from execution engine 38 to memory 48.

Memory 48 can be any form of static or dynamic RAM to convert the sensitivity value E into both a delay coefficient and a filter coefficient. The delay and filter coefficients are shown for sake of brevity as a single coefficient C. Depending on where those coefficients are sent to corresponding outputs from the microphone pair, the coefficients are labeled as $C_A$ or $C_B$. A delay circuit 50a or 50b is a circuit that introduces a time or phase delay into its output based on the magnitude of the delay coefficient placed into its input. Delay circuit 50a and 50b can consist of any circuit which imparts delay on the electrical signal proportional to the delay coefficient. The time- or phase-delayed electrical signal is then output to a filter 52a or 52b. Filters 52a and 52b are tuned filters that respond to the weighted coefficient $C_A$ and $C_B$ to increase or decrease gain output of the incoming, properly delayed electrical signal depending on the detected frequency w as well as the angle of incidence φ imparted to the weighting coefficient from memory 48.

Instead of the weighting coefficient being dependent only on $\beta$, which does not take into account frequency dependence, the present weighting coefficient used by filters 52a and 52b takes into account frequency w as well as angle $\phi$. By delaying and applying the proper gain at certain measured frequencies, output from filters 52a and 52b can be combined with the incoming, non-delayed, and non-filtered electrical signal by mixers 54a and 54b. Mixers 54a and 54b are alternatively referred to as a sum node by which digital signals are added to one another. If the proper weighting and delay coefficients are calculated, then the output from mixers 54 will be increased beyond the incoming electrical signal. This increase will cause a corresponding increase in SNR to effectuate a steerable radial axis of the resulting directional response. The two or more mixed electrical signals can thereafter be again combined by a mixer 56 to produce an output of maximum SNR. The updated radial axis of the directional response is thereby formed as a synthesized dipole microphone formed by taking into account both w and $\phi$ when arriving at the filter and delay coefficients. Those coefficients cause each of the pair of mixers to enhance the incoming electrical signal amplitude for the source, wherever it may be moved and whatever frequency it may emit.

Figure 7:
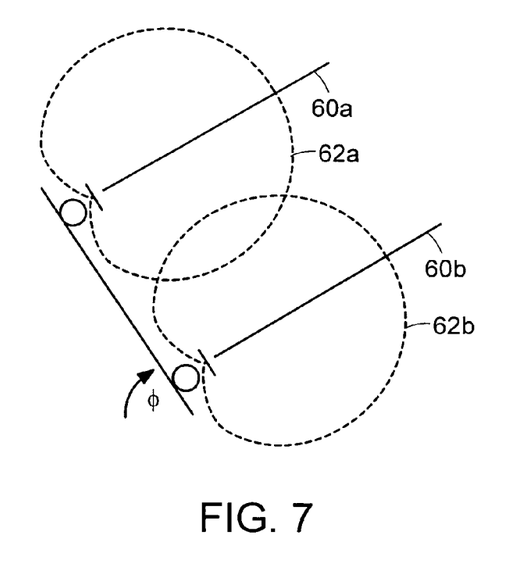
FIG. 7 is a top plan diagram of a microphone array virtually rotated to accommodate the new directional response calculated from the system of FIG. 6 for optimally capturing an acoustic wave traveling at an angle that has changed from a previous angle.

FIG. 7 illustrates the updated radial axis for the angle of incidence shown in FIG. 4.

Radial axes 60a and 60b thereby track the angle of incidence and effectively produce a pair of directional responses 62a and 62b having maximum SNR along the corresponding radial axes. The microphone array can be thought of as being "virtually" rotated by the angle of incidence $\phi$ so that the radial axes are placed in a virtual 0° angle relative to the direction of the acoustic signal.

Figure 8:
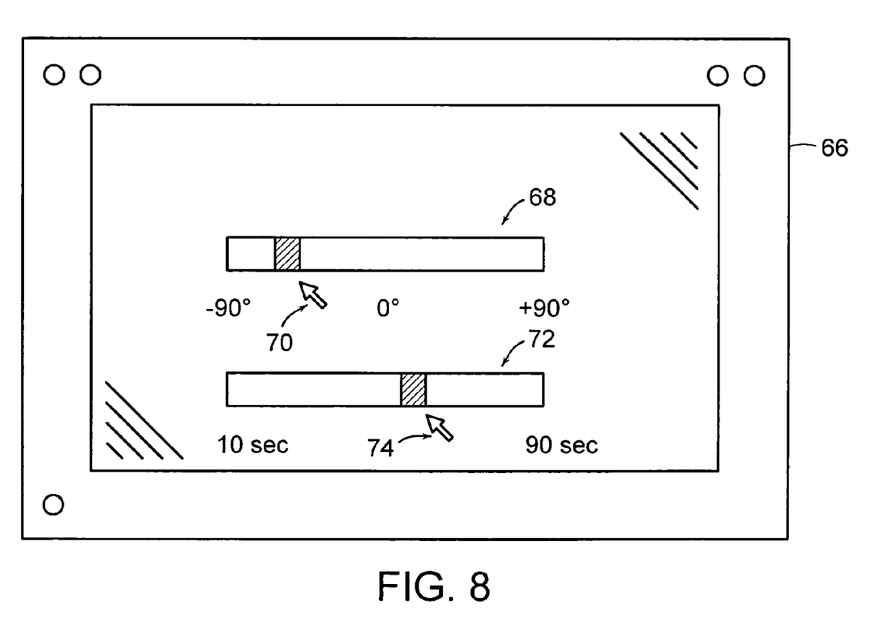
FIG. 8 is an electronic display having a microphone array formed within the display casing and a screen shot showing the current, automatically calculated, directional response of the acoustic source relative to the microphone array and the current frequency at which directional response is calculated, both of which can be manually overridden by a graphic user interface.

Although the present system will automatically and adaptively track any movement in the acoustic source and modify the radial axis of the directional response accordingly, the radial axis can be displayed along with the frequency at which tracking occurs. As shown in FIG. 8, the radial axis can be displayed in a portion of a screen shot window of a display device 66. The radial axis can be displayed in any form visible to a user. In the example shown, the radial axis is illustrated as a darkened region within a bar graph 68. For example, the system may calculate a radial axis of the directional response at approximately −60°, as shown. However, if the user wishes to change the radial axis to capture possibly another acoustic source at +15°, the user will implement a pointing device 70 and drag the blackened region along the bar graph 68 to the +15° position. Use of a graphical user interface (GUI) allows the user to modify the radial axis to capture possible another sound source oriented different from the sound source that is being automatically tracked. The GUI works with, for example, the Windows®-based operation system display drivers, such as Windows® XP Tablet PC operating system toolkit available from Microsoft Corp. The concept of GUI and modifying computational devices and their output by modifying the graphical image is generally known to those skilled in the art.

In addition to a bar graph 68 illustrating the radial axis, possibly another bar graph 72 can be displayed to indicate how often measurements are taken during the tracking operation. For example, if the acoustic source moves rapidly, it may be necessary to increase the frequency at which measurements are taken by moving the darkened region to the left within bar graph 72 using the pointer device 74.

Figure 9:
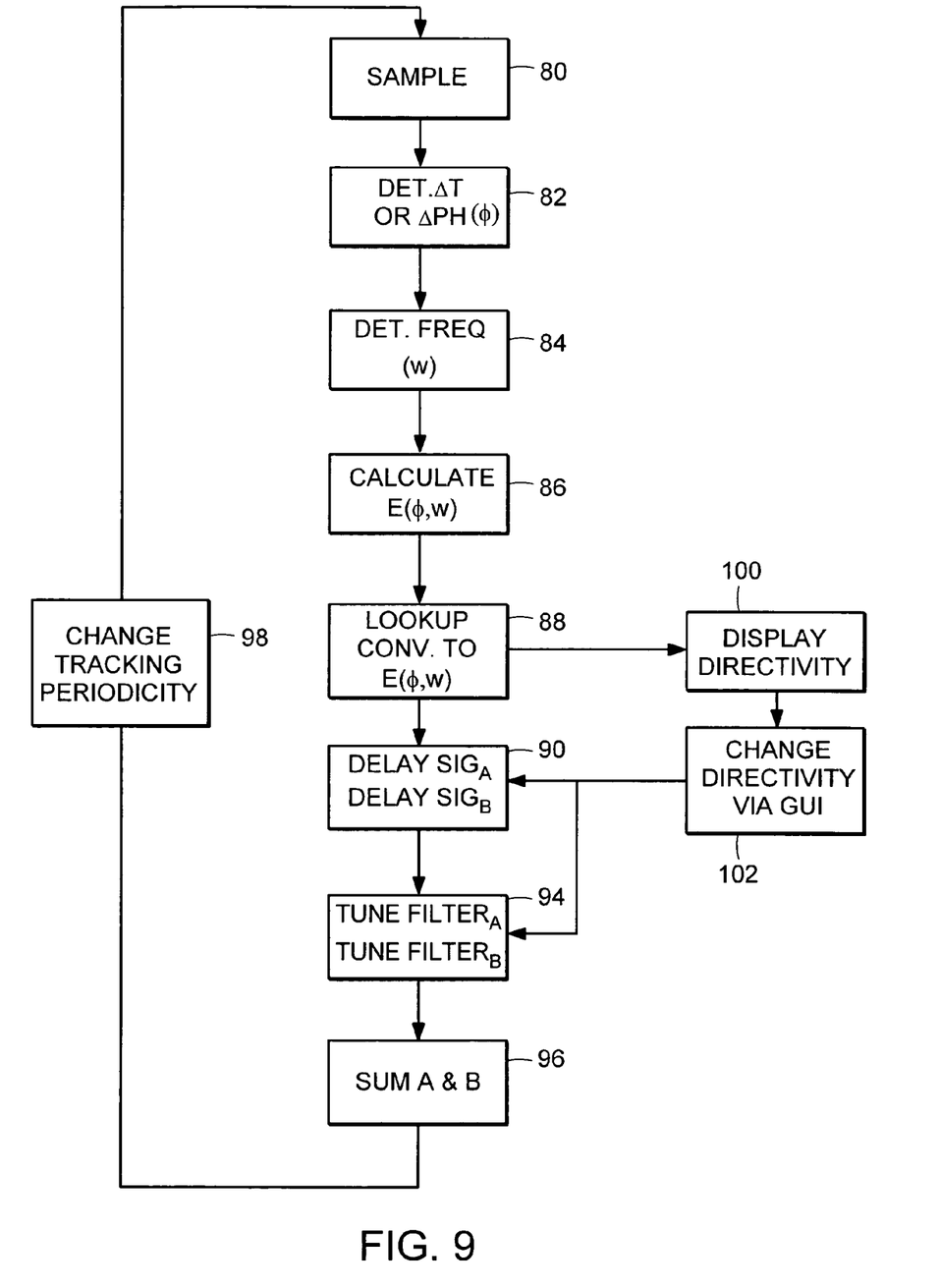
FIG. 9 is a flow diagram of a sequence of steps used to periodically calculate the directional response, apply an appropriate delay and frequency tuning to one or more signals captured by the microphone array, with manual overrides using a graphical user interface.

Referring to FIG. 9, the methodology and sequence of steps utilized to track a moving source and thereby update the directional response is shown. The method begins by taking periodic samples from the output of a microphone array 80. The samples are used to perform A/D conversion by quantizing the analog signal into discrete digital signals using any of the well known modulation techniques. Using the digital signals, the delay and time of arrival or phase can be measured 82, as well as the frequency at which the acoustic wave transitions 84. Using the angle of incidence and the frequency measurements, the directional response of the microphone array can be calculated to achieve maximum SNR 86. The directional response value will equate to delay and weighting coefficients when performing a lookup operation 88. The delay coefficient to be applied to the output signal from each of the microphones within the array is then adjusted to an appropriate delay amount from each corresponding output 90.

The weighting coefficient is then applied to tune the corresponding filters at each of the respective outputs of the microphones to further attenuate or enhance the amplitude at various frequencies along the frequency spectrum 94. Outputs from each of the microphones are thereby adjusted by the delayed and tuned signal to achieve maximum SNR and a virtual or effective change in the directional response by summing each of the adjusted microphone outputs 96. The process of steps 80-96 is repeated at a set interval, which can be changed 98 if desired.

The sensitivity value $E(\phi,w)$ of the directional response can be displayed on, for example, a portable device electronic display output 100. Preferably, the directivity response can be manipulated by a user via a pointing device to change the directivity response 102. Like the automatically calculated directivity response, the manually changed directivity response can be forwarded into the lookup tables to calculate the appropriate delay and weighting coefficients for the radial axis selected via the GUI.

It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system for enhancing the signal-to-noise ratio of a microphone array output, comprising:
   a detector adapted for determining a change in angle of incidence at which an acoustic signal impinges upon the microphone array;
   an electronic subsystem coupled to the detector for calculating at periodic intervals a delay coefficient for each microphone within the microphone array;
   a delay circuit coupled to change the output of each microphone within the microphone array corresponding to the respective delay coefficient; and
   an output device coupled to the electronic subsystem for displaying the angle of incidence, wherein the output device comprises a graphic user interface (GUI) through which a user can supply input via a pointer to change the angle of incidence and to set the periodic interval.

2. The system as recited in claim 1, wherein the detector comprises a phase detector for determining a difference in phase angle at which the acoustic signal impinges upon each microphone within the microphone array.

3. The system as recited in claim 1, wherein the detector comprises a counter for counting a number of time periods between when the acoustic signal impinges upon each microphone within the microphone array.

4. The system as recited in claim 1, wherein the electronic subsystem comprises an execution engine and a storage device for receiving instructions and performing a lookup operation for calculating a change in a directional response for the microphone array corresponding to the change in angle of incidence.

5. The system as recited in claim 4, wherein the directional response of the microphone array has a maximum signal-to-noise ratio along a radian extending from each microphone within the array substantially equal to the angle of incidence.

6. The system as recited in claim 1, further comprising a frequency detector, a filter, and the electronic subsystem coupled to between the frequency detector and filter for calculating at periodic intervals a weighting coefficient for each microphone and changing the output of each microphone within the microphone array corresponding to the respective weighting coefficient.

7. A system for automatically updating a directional response of a pair of microphones whenever an acoustic source moves, comprising:
   at least one detector configured to determine a change in one or more parameters of an acoustic wave forwarded from the acoustic source to the pair of microphones;
   an electronic subsystem coupled to the at least one detector for periodically updating the directional response from the change in one or more parameters for placing a radial axis of the directional response substantially along an angle at which the acoustic wave impinges upon the pair of microphones; and
   an output device coupled to the electronic subsystem for displaying the radial axis of the directional response, wherein the output device comprises a graphic user interface (GUI) through which a user can supply input via a pointer to change the radial axis of the directional response and to set the periodic updating of the directional response.

8. The system as recited in claim 7, wherein the one or more parameters comprises a time difference between when the acoustic wave impinges upon the pair of microphones and a frequency of the acoustic wave.

9. The system as recited in claim 7, wherein the one or more parameters comprises a phase difference between when the acoustic wave impinges upon the pair of microphones and a frequency of the acoustic wave.

10. The system as recited in claim 7, wherein the electronic subsystem comprises an execution engine and memory for calculating the updated direction response from the change in one or more parameters by decoding an instruction forwarded to the electronic subsystem and performing a lookup operation within the memory.

11. The system as recited in claim 7, further comprising a delay element and an tunable filter coupled to an output of each of the pair of microphones for receiving the updated directional response for delaying output from one of the pair of microphones and tuning the frequency response output from one or more of the pair of microphones to maximize a signal-to-noise ratio output from the pair of microphones.

12. The system as recited in claim 11, wherein the signal-to-noise ratio is maximum along the radial axis of the directional response.

13. The system as recited in claim 7, wherein the pair of microphones, at least one detector, and the electronic subsystem are contained within a portable system separated from the acoustic source by more than 3 inches.

14. A method for changing the directional response of a pair of microphones having a directivity pattern of maximum signal-to-noise ratio along a radial axis extending from the pair of microphones, comprising:
   moving an acoustic source;
   determining an angular orientation of an acoustic wave extending from the moved acoustic source to the pair of microphones;
   modifying outputs from one or more of the pair of microphones such that the directional response of the pair of microphones is updated to substantially align with the angular orientation of the acoustic wave;
   displaying the radial axis of the updated directional response and using a pointing device to change the radial axis; and
   displaying the frequency at which the output are modified and using a pointing device to change that frequency.

15. The method as recited in claim 14, wherein said determining comprises detecting changes in phase and/or time of arrival of the acoustic wave upon the pair of microphones.

\* \* \* \* \*